Patented Aug. 5, 1947

2,425,023

UNITED STATES PATENT OFFICE 2,425,023

SHELLAC COATING COMPOSITIONS

Henry Hall Bassford, Jr., Cranford, N. J., assignor to U. S. Shellac Importers Association, Inc., New York, N. Y., a corporation of New York No Drawing. Application May 25, 1943, Serial No. 488,399

3 Claims. (Cl. 106—237)

This invention relates to preparations containing shellac, including coating compositions generally, varnishes, paints, pastes, adhesives and other products.

Objects of the present invention are to provide (1) a clear aqueous shellac solution or varnish; (2) a shellac solution or varnish capable of yielding tough, adhesive, permanently flexible water-resistant films, and (3) a shellac-solution or varnish which is adapted to be further modified by the incorporation therein of suitable pigments, fillers, extenders, and other substances to provide paints, pastes, and other useful products. In other words, it is an object of this invention not only to provide a shellac solution or varnish useful in and of itself as a coating composition or adhesive but also as a vehicle for other products such as paints, etc.

Briefly and more particularly, the present invention involves the solution of shellac in a volatile and less volatile solvent; adding thereto a volatile or volatilizable alkali, and thinning the resulting product with water. In this form the product may be used as a varnish or coating material, or thereto may be added pigments, extenders, etc., to provide paints, pastes, etc., all as more fully discussed hereafter. In order to impart permanent flexibility to said shellac solution or varnish, there is added thereto a suitable water-insoluble plasticizer, of which more is said hereafter.

Aqueous alkaline shellac solutions have been and are generally used as leather and shoe dressings, paper and metal coatings, lithographic varnishes, floor waxes, inks and the like. Films prepared using these solutions, however, are brittle, deficient in toughness and adhesion, and tend to flake off. They possess practically no water resistance. The tendency of the films to flake off can be and have been overcome to a certain extent by the addition of water-soluble plasticizers such as glycerine. Water-soluble plasticizers, however, do not impart permanent flexibility; furthermore, air-dried films from aqueous solutions of the products, although permanently flexible, are inferior to alcohol shellac varnish films in toughness, hardness and adhesion, and are poor in water resistance.

For certain uses, as for example hat stiffening, shellac is treated with boiling water containing insufficient borax to completely neutralize the shellac. By proper technique, it is possible to suspend the excess shellac as a milky-disperse phase. The resulting emulsion, however, yields films which have no better water resistance than films prepared using a solution containing sufficient borax to produce a clear varnish. None of the plasticizers soluble in this type of varnish imparts permanent flexible films. There are no prior teachings regarding the use of aqueous shellac solutions, nor regarding the use of such solutions as coating materials.

Clear aqueous shellac varnishes which are highly adhesive in character and yield water-resistant films on evaporation are obtained according to the present invention by dissolving shellac in a mixture of organic solvents, one of which preferably boils above the boiling point of water, adding to this solution insufficient volatile or volatilizable alkali to completely neutralize the shellac and finally diluting this solution with water to the consistency desired.

Aqueous solutions of unmodified shallac which yield permanently flexible films upon evaporation may be obtained by following the above procedure providing a sufficient amount of water-insoluble plasticizer is dissolved in the organic solvent prior to mixture with the water phase.

The foregoing described procedure provides a method of obtaining an aqueous substitute alcohol shellac varnish. This is achieved by carefully adjusting the ratio of organic solvent to alkali, so that the resulting varnish possesses a considerable proportion of free shellac to impart the necessary toughness and adhesion to its films.

In this application shellac is taken to include all forms of lac, the secretion of the insect *Tachardia lacca* Kerr, whether in raw, refined or manufactured form. Modified lac is taken to include all forms of lac which have been materially modified by chemical means. "Bleached shellac" includes all forms of lac which have been subjected to the action of chlorine or sodium hypochlorite and include such products as "white lac," refined bleached shellac, "decolorized hard lac," etc.

In addition to ammonia, any amine volatile below about 130 degrees C. and having a dissociation constant greater than $10^{-6}$ may be used to prepare the products described in this application. Examples are: dimethylamine, ethylene diamine and morpholine.

Solvents which may be used in preparing these products include methyl, ethyl and propyl alcohols for the low boiling constituent; butyl or amyl alcohol, Cellosolve, methyl Cellosolve, and the like, for the high boiling constituent.

Water-insoluble plasticizers which are fairly compatible with shellac, such as ortho and para-toluene ethyl sulfonamide, or a mixture of the same, tricresyl phosphate, castor oil, and the like, produce films which level well and possess excellent gloss and adhesion. However, I have found that oils which are practically incompatible with shellac, such as dehydrated castor oil, heavy white mineral oil, and the like, produce films which although lacking in gloss and adhesion, are permanently flexible.

Due to the swelling action of water on wood, these shellac varnishes should not be used on unprimed wood. However, they can be used over a rosin or drying oil primer to produce a finish comparing favorably with that obtained from a non-aqueous alcohol shellac varnish. They are equally suitable for coating metal and paper objects and as a binder for drawing and printing inks.

Furthermore, they are especially suitable for coating stone, plaster, brick or other porous surfaces. Since they are not affected by further dilution with water, they can be applied to damp concrete or plaster walls. When applied to brick, concrete or plaster walls the varnishes described in this application usually dry to produce a tough tenacious film which does not lift or peel as does a drying oil or varnish film when applied to this type of surface.

The varnishes can be prepared in a variety of ways. It should be kept in mind however that each of the components has its specific use. The high boiling alcohol, such as butyl alcohol, is used so that it will remain behind after all of the water has evaporated from the film. The final wet film, therefore, consists of shellac, volatile or volatilizable alkali, and water-insoluble plasticzer in butyl alcohol, a mutual solvent. The ethyl alcohol is used to decrease the viscosity of the solution and also to aid in the removal of the last traces of butyl alcohol. The volatile or volatilizable alkali reacts with a portion of the shellac to form a shellac soap which acts as a detergent for solubilizing the excess shellac.

It is important that the amount of alkali be carefully regulated. If an amount equivalent to the shellac is used, a film is obtained which has only two or three times the water resistance of a water solution of the corresponding shellac soap. However, by using less than the stoichiometric amount of alkali, films can be obtained whose water resistance closely approaches that possessed by alcohol shellac varnish. Furthermore, the use of a relatively weaker alkali is desirable since it is partially removed during the final drying of the film, because the shellac soaps are unstable in butyl alcohol solution. The use of a water-insoluble plasticizer is required since the water soluble plasticizers are not miscible with shellac at room temperature and consequently exert no plasticizing action once the film is completely dry. Furthermore, the water-insoluble plasticizer is a water repellant and improves the water resistance of the dry film. Finally, the use of water as the main solvent for shellac varnishes not only serves as a substitute for a large part of the ethyl alcohol customarily used as a solvent and thinner, but also extends the field of utility for shellac as a coating material.

The following examples are illustrative of the invention:

Example I

A shellac varnish which yields hard, adhesive and water-resistant films may be prepared as follows: 100 gms. of orange shellac are dissolved in a solvent mixture containing 50 cc. of ethyl alcohol, 50 cc. of butyl alcohol and 9 cc. of morpholine. The resulting solution is then thinned with 100 cc. or more of water to produce a clear aqueous varnish of satisfactory brushing consistency.

Example II

A shellac varnish which yields permanently flexible, water-resistant films upon evaporation may be prepared by dissolving 100 gms. of orange shellac in a solvent mixture consisting of 50 cc. of ethyl alcohol, 50 cc. of butyl alcohol, 9 cc. of morpholine and 30 gms. of a water-insoluble plasticizer, such as Santicizer No. 8 (ortho or paratoluene ethyl sulfonamide), and then diluting the resulting solution with 100–150 cc. of water. The resulting varnish is clear and yields clear films which show no tendency to blush or bloom during drying.

Films from the varnishes described in Examples I and II were compared with each other and with a control film prepared from a solvent-free water solution of neutral morpholinium shellacate. The films from the varnishes exemplified by Examples I and II possessed five to ten times the adhesion and ten times the wet scrub resistance shown by the control. Neither the control film nor that prepared from the varnish of Example I remained flexible on thorough drying. Films on metal and paper prepared using the varnish described in Example II, were unaffected, however, by being bent around a one-eighth inch mandril even after two months of air-drying.

Preparation of paints

The pigments which can be used are those which are alkali-resistant such as the iron oxides, yellow, red and black oxide (limonite, hematite, $Fe_2O_3$ and magnetite $Fe_3O_4$). These suffice for the shades known commercially as black iron oxide, burnt umber, burnt sienna, yellow oxide, red oxide. Carbon black pigments can also be used for a black shade.

For green pigment for tinting, one may use chrome oxide, $Cr_2O_3$, or phthalocyanine green. For blue the phthalocyanine blue. For white, zinc sulfide and titanium dioxide.

Extenders which have proven satisfactory for this type of work are talc, diatomaceous earth, finely powdered silica, barium sulfate, and the like. Whiting may not be used except where the paint is going to be used immediately since on long standing it reacts and causes breaking down of the varnish.

A suitable pigmentation for the varnish described in Example II would be to add 100 parts of talc and 50 parts of chrome oxide green to 240 parts of the diluted varnish. This paint is pasty in consistency and can be thinned with one-half its volume of water to yield a product of satisfactory brushing consistency.

The formulation of the paste paint is as follows:

| | Grams |
|---|---|
| Orange shellac | 100 |
| Ethyl alcohol | 50 |
| Butyl alcohol | 50 |
| Morpholine | 9 |
| Mixture of ortho and paratoluene ethyl sulfonamide | 30 |
| Water | 100 |
| Talc | 100 |
| Chrome oxide green | 50 |

As will be observed the pigment volume is about 30%, the resulting paint has a moderate gloss reading about 10 on the 60 degree gloss meter. The paint film after thorough drying possesses excellent water-resistance and remains permanently flexible. When applied to metal panels it is substantially unaffected by outdoor exposure at 45 deg. south for six months. This paint has been tested for wet abrasion resistance and passes satisfactorily the requirements in Federal Specification TTP—88 for covering resin emulsion paints. Obviously other pigments of the type described earlier can be substituted in order to obtain the specific shade desired.

The pigmentation of the varnish described in Example III may be carried out in the following fashion: 160 cc. of the varnish therein described, which contains approximately 40 grams of non-volatile material are placed in a ball mill with 40 grams of titanium dioxide. The mixture is ground until the pigment is completely dispersed, the final paint having, as may be observed from the directions, a pigment volume of approximately 25%. Films from this paint dry to an eggshell to semi-gloss finish. None of the commercially available aqueous emulsion type paints will produce a film having a semi-gloss effect but are recommended only for use as flat finishes.

The above paint can be extended with 80 grams of talc to yield a paint whose pigment volume is approximately 100% (i. e., the volume of pigment equals the volume of non-volatile binder) and this paint yields films of a pleasing flat finish having good adhesion, moderate flexibility and water resistance.

Having described my invention, what I claim is:

1. A clear aqueous shellac varnish capable of yielding permanently flexible, water-resistant films on air-drying, comprising one equivalent of shellac, less than one equivalent of a volatile or volatilizable alkali, a mixture of aliphatic alcohols, one of which is butyl alcohol or other alcohol boiling above 100 deg. C., and a second one of which is an alcohol boiling substantially below 100 deg. C. and which is in about the same proportions as the butyl alcohol and a water-insoluble but alcohol-soluble plasticizer, and water.

2. A product containing in relative proportions about 100 gms. of shellac dissolved in 50 cc. of ethyl alcohol and 50 cc. of butyl alcohol, 9 cc. of morpholine, and diluted with upwards of 100 cc. of water.

3. A product containing in relative proportions 100 gms. of shellac dissolved in 50 cc. of ethyl alcohol and 50 cc. of butyl alcohol, 9 cc. of morpholine, 30 gms. of ortho or paratoluene ethyl sulfonamide and 100–150 cc. of water.

HENRY HALL BASSFORD, Jr.

REFERENCES CITED

The following references are of record in the file of this patent:

UNITED STATES PATENTS

| Number | Name | Date |
| --- | --- | --- |
| 2,060,928 | Damitz | Nov. 17, 1936 |
| 2,071,917 | Bren | Feb. 23, 1937 |
| 2,100,408 | Platt | Nov. 30, 1937 |
| 2,227,720 | Kallander et al. | Jan. 7, 1941 |
| 2,245,100 | Bernstein | June 10, 1941 |

FOREIGN PATENTS

| Number | Country | Date |
| --- | --- | --- |
| 540,310 | Great Britain | Oct. 13, 1941 |